US012632366B2

(12) United States Patent
Smith et al.

(10) Patent No.: US 12,632,366 B2
(45) Date of Patent: May 19, 2026

(54) ACCELERATED EVENT GENERATION FOR SUPERVISED LEARNING

(71) Applicant: Dell Products L.P., Round Rock, TX (US)

(72) Inventors: Erik P. Smith, Douglas, MA (US); Edward Henry, Jurupa Valley, CA (US); Gajanan S Natu, Cary, NC (US); Sumanta SK Kashyapi, Worcester, MA (US); David Carl Sydow, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 18/646,089

(22) Filed: Apr. 25, 2024

(65) Prior Publication Data

US 2025/0335337 A1 Oct. 30, 2025

(51) Int. Cl.
*G06F 11/3668* (2025.01)

(52) U.S. Cl.
CPC ................................ *G06F 11/3684* (2013.01)

(58) Field of Classification Search
CPC .................................................. G06F 11/3684
USPC ............................... 717/124–140; 706/25–45
See application file for complete search history.

(56) References Cited

U.S. PATENT DOCUMENTS

| | | | | |
|---|---|---|---|---|
| 1,572,451 | A * | 2/1926 | Taylor | B28D 1/041 |
| | | | | 125/20 |
| 8,874,477 | B2 * | 10/2014 | Hoffberg | G06Q 20/065 |
| | | | | 705/37 |
| 8,930,758 | B2 * | 1/2015 | Budnik | G06F 11/3688 |
| | | | | 714/33 |
| 10,073,763 | B1 * | 9/2018 | Raman | G06N 20/00 |
| 10,839,415 | B2 * | 11/2020 | Fleming | G06Q 30/0239 |
| 11,416,609 | B1 * | 8/2022 | Hencinski | G06F 21/554 |
| 11,640,163 | B1 * | 5/2023 | Nguyen | G05B 23/0221 |
| | | | | 702/183 |
| 12,271,423 | B1 * | 4/2025 | Veron Vialard | G06N 3/08 |

OTHER PUBLICATIONS

Cheng et al, "Test-Case Prioritization for Configuration Testing", ACM, pp. 1-15 (Year: 2021).*
Yoo et al, "Clustering Test Cases to Achieve Effective & Scalable Prioritisation Incorporating Expert Knowledge", ACM, pp. 1-12 (Year: 2009).*
Bilal et al, "Finding the Right Cloud Configuration for Analytics Clusters", ACM, pp. 1-16 (Year: 2020).*

* cited by examiner

*Primary Examiner* — Anil Khatri
(74) *Attorney, Agent, or Firm* — Chamberlain, Hrdlicka, White, Williams & Aughtry; Aly Z. Dossa

(57) ABSTRACT

A method for generating testing information for prediction model training includes: identifying, by an automated event generation and data labeling (AEGDL) manager, a test case initiation event; in response to the identification: selecting a first test case of a plurality of test cases; identifying a first test configuration cluster (TCC) of a plurality of TCCs based on the test case; performing the first test case in the TCC; generating testing information based on the performing of the first test case in the TCC; and providing the testing information to prediction models for model training.

19 Claims, 9 Drawing Sheets

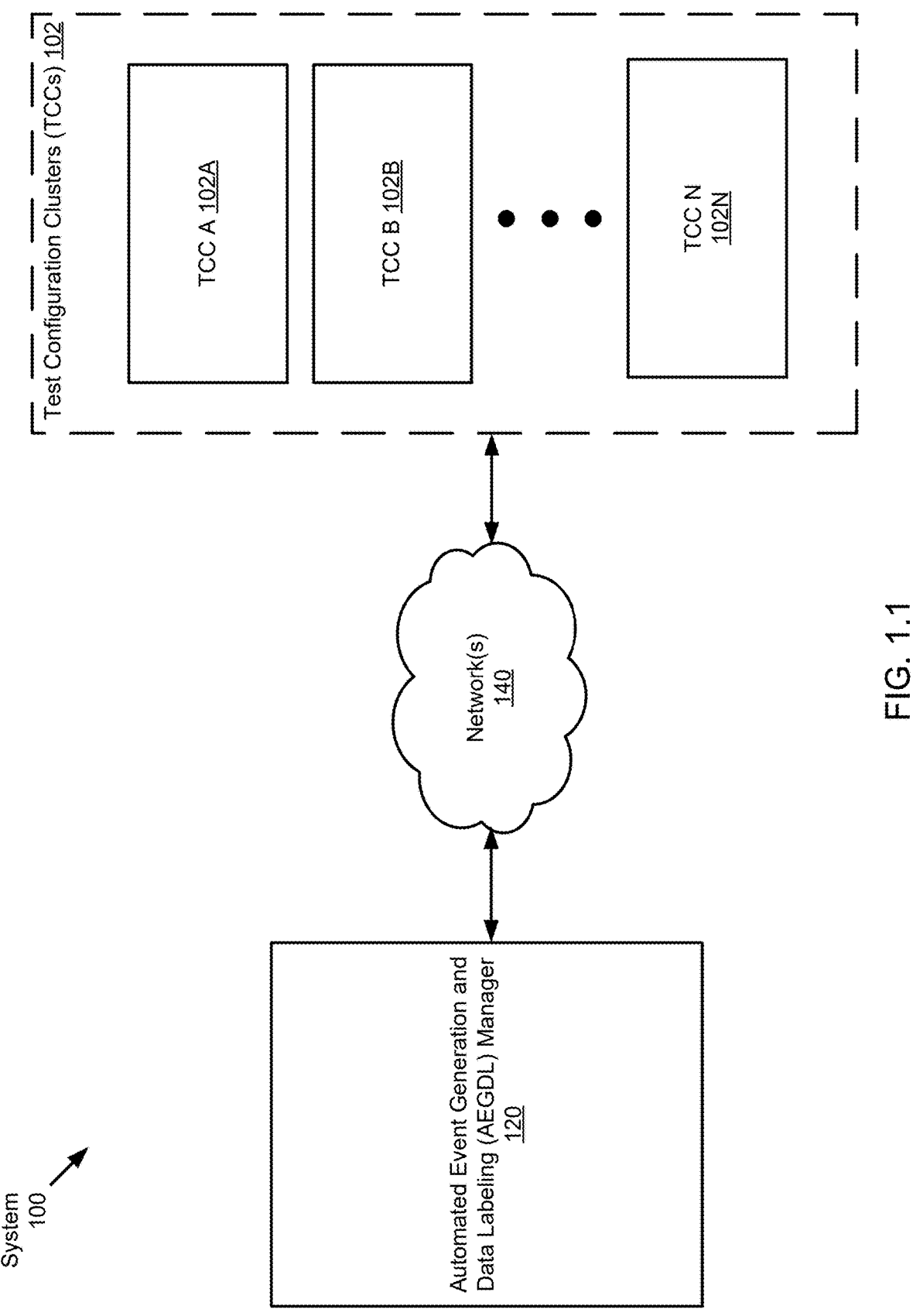
FIG. 1.1

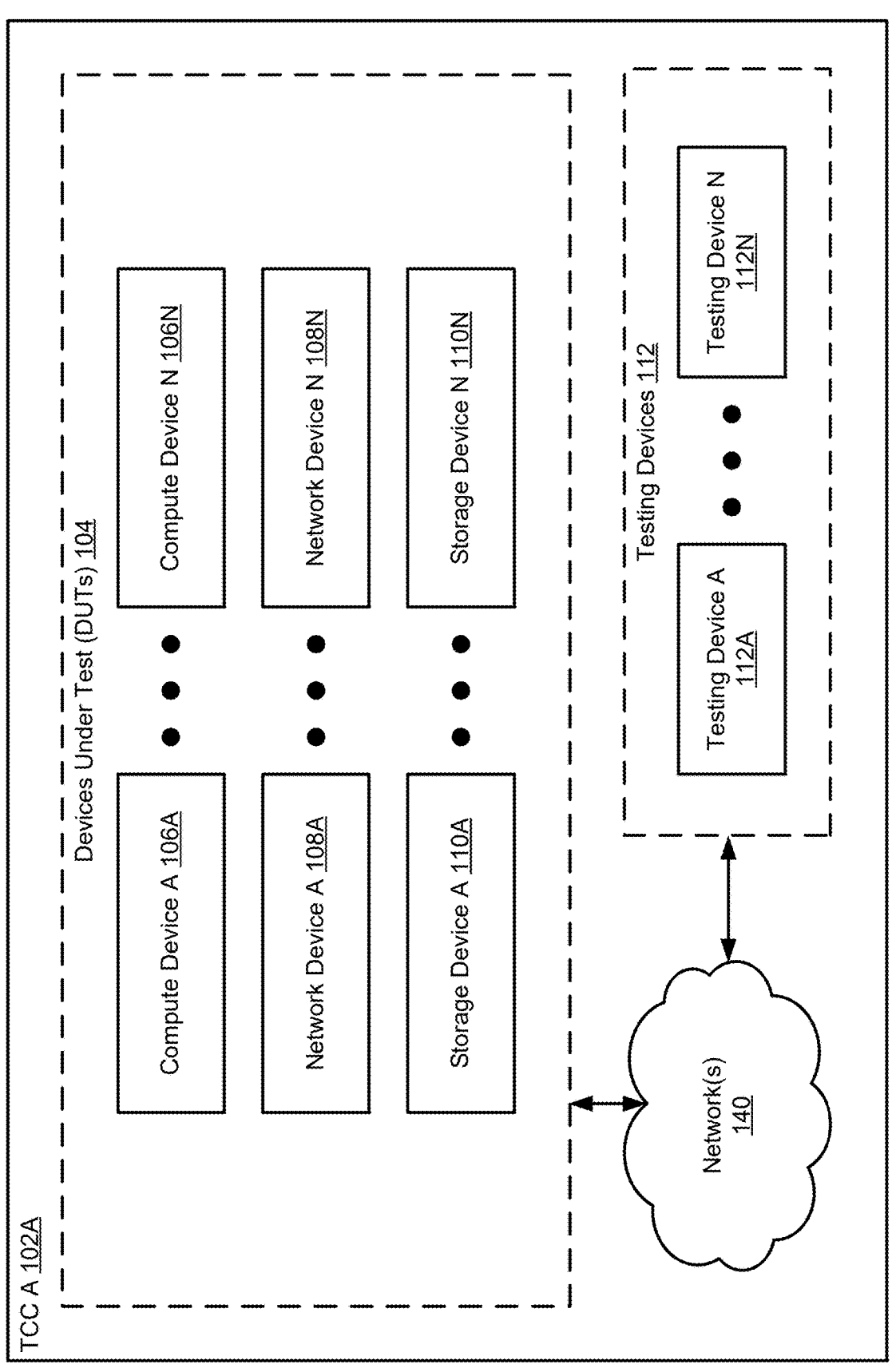
FIG. 1.2

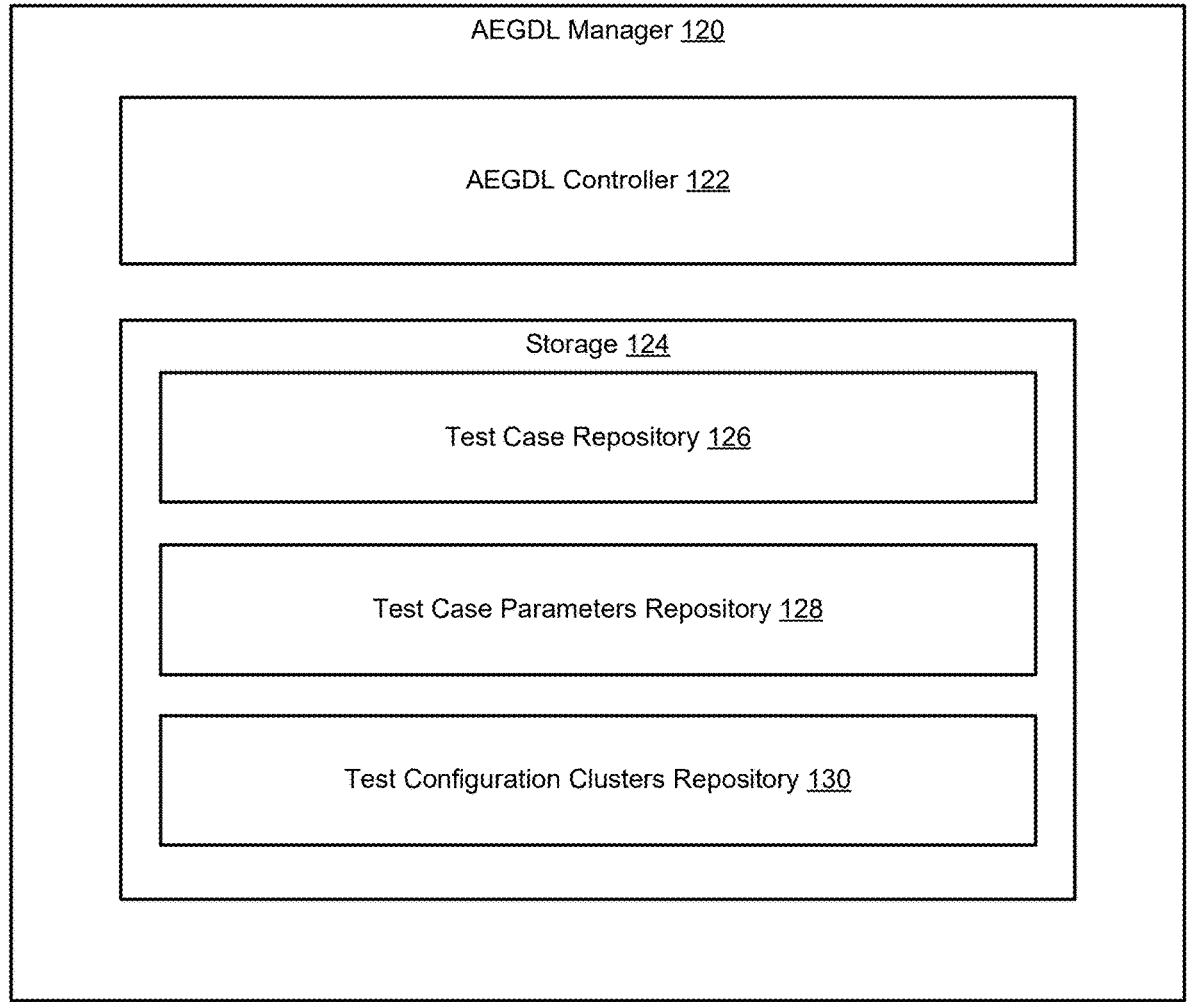
FIG. 1.3

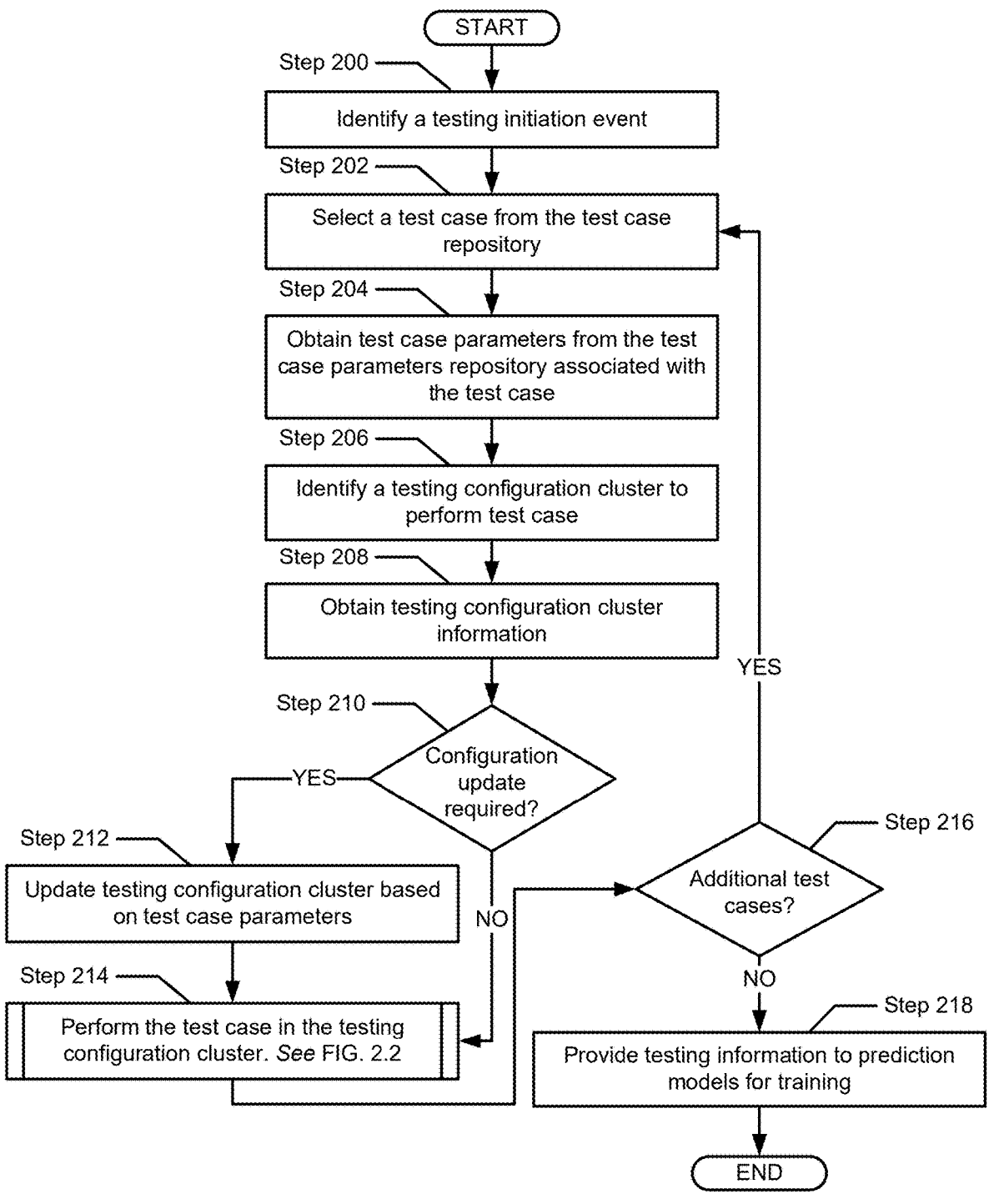
FIG. 2.1

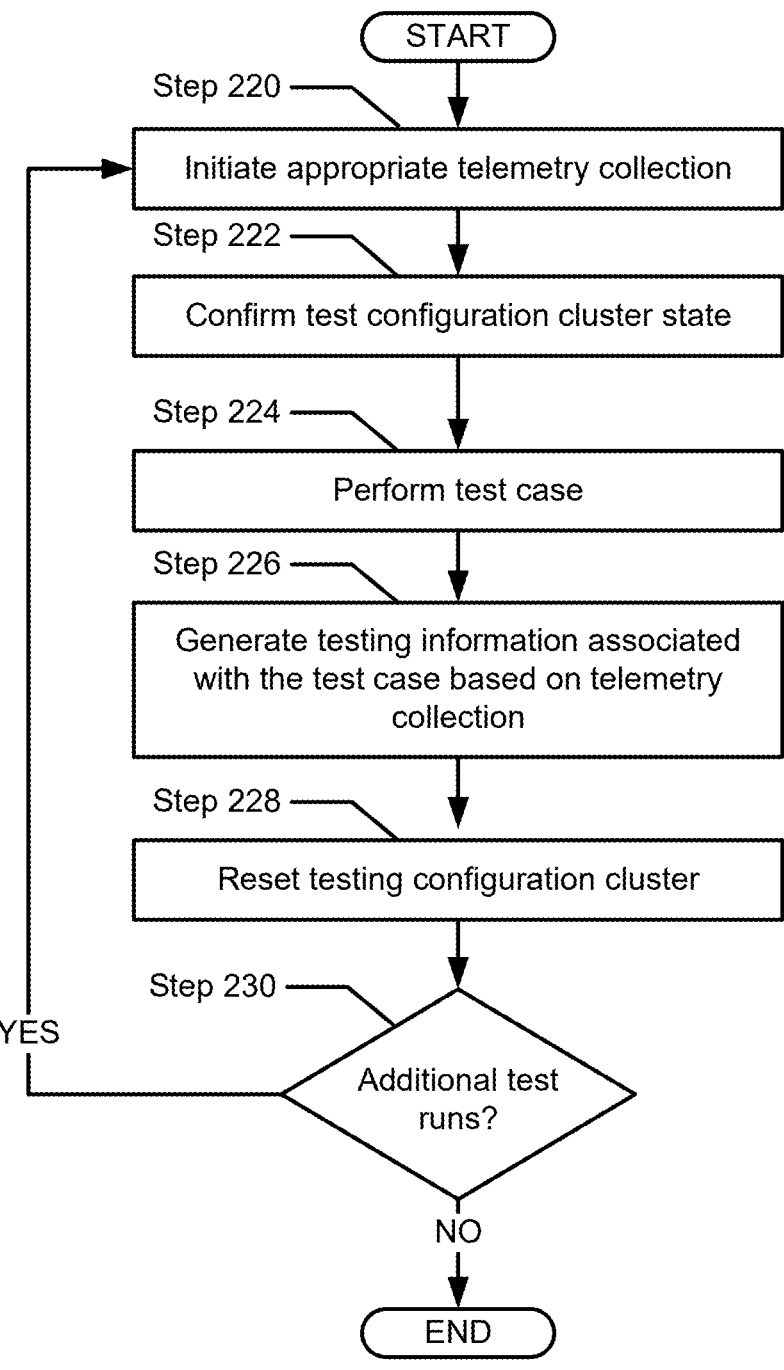
FIG. 2.2

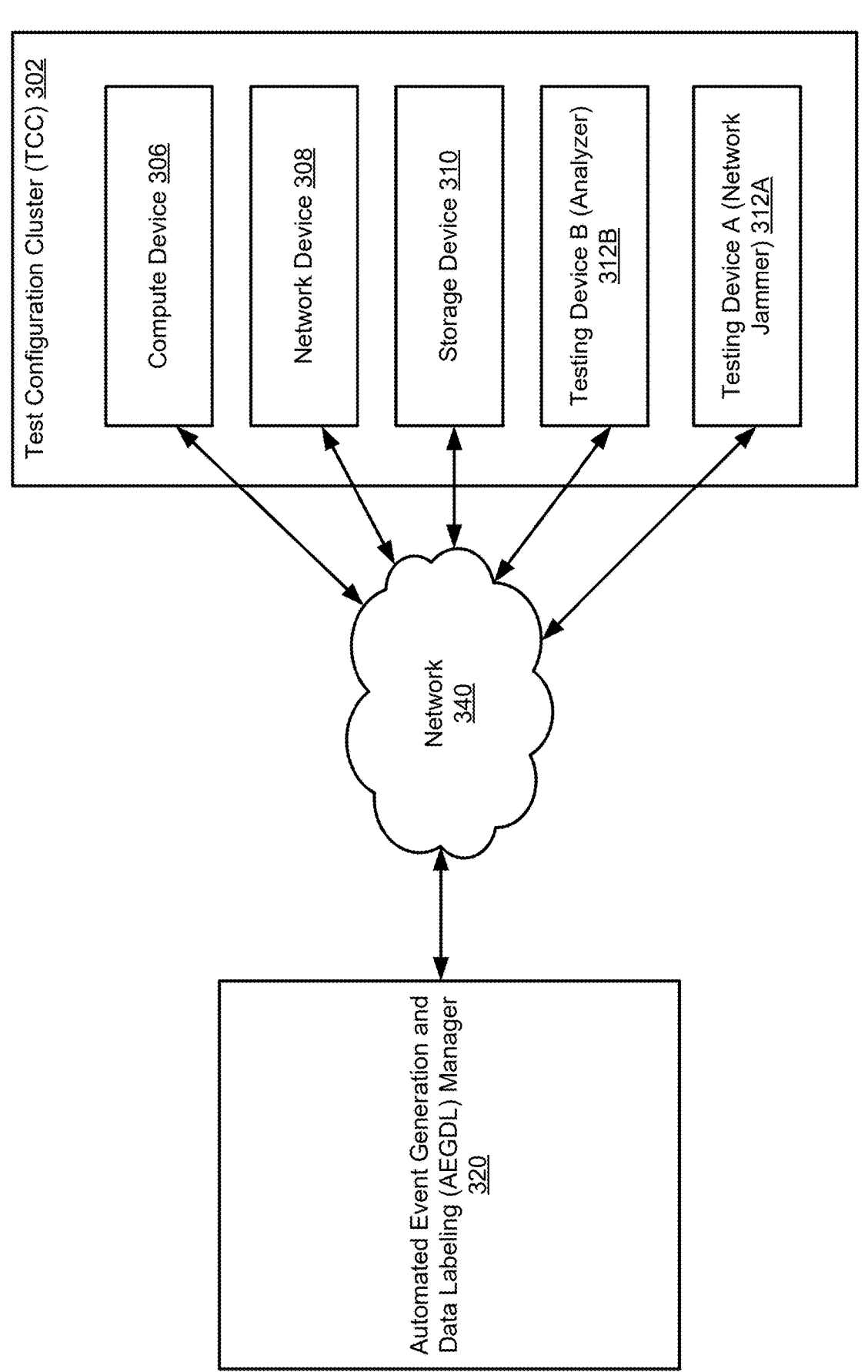
FIG. 3.1

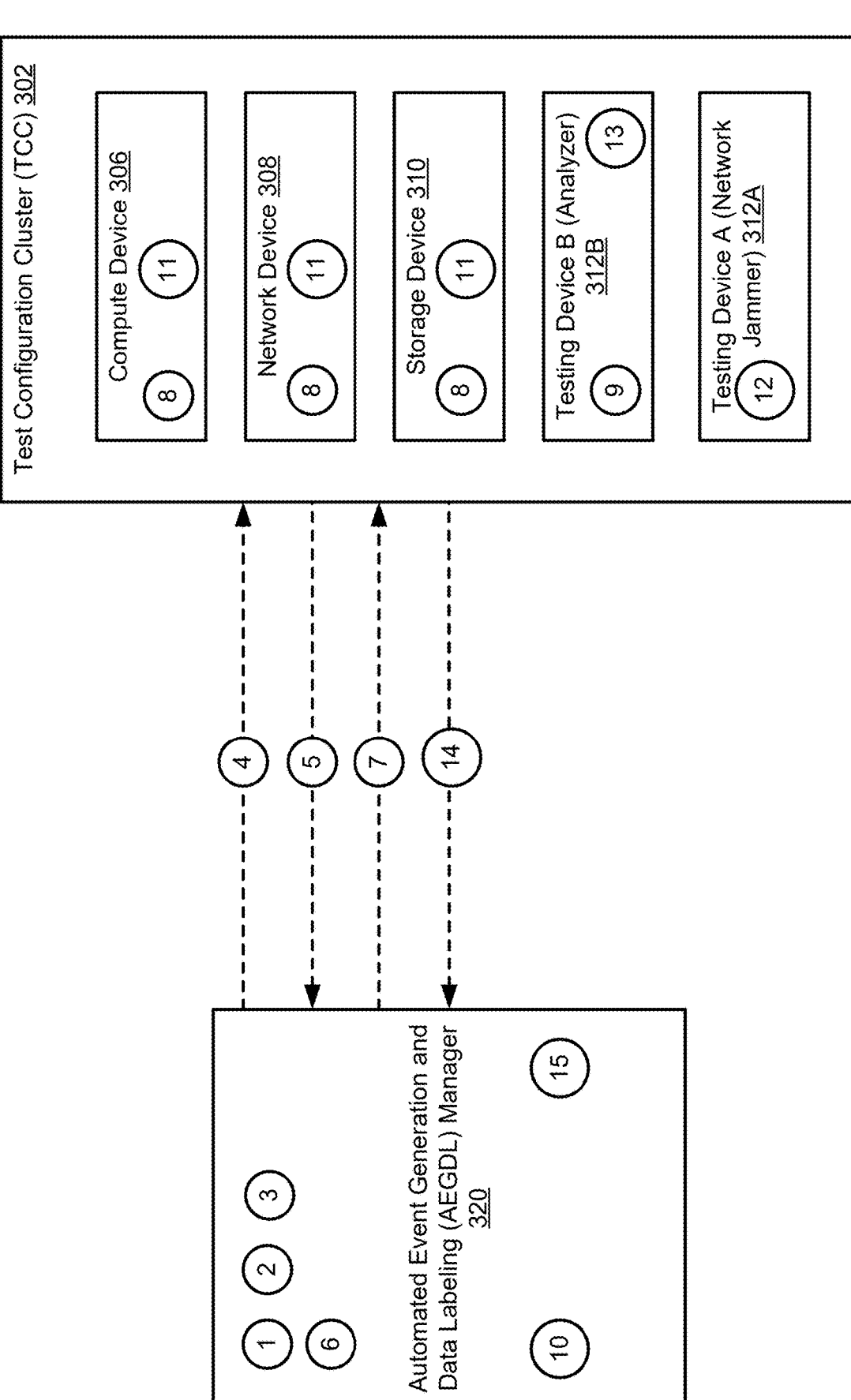
FIG. 3.2

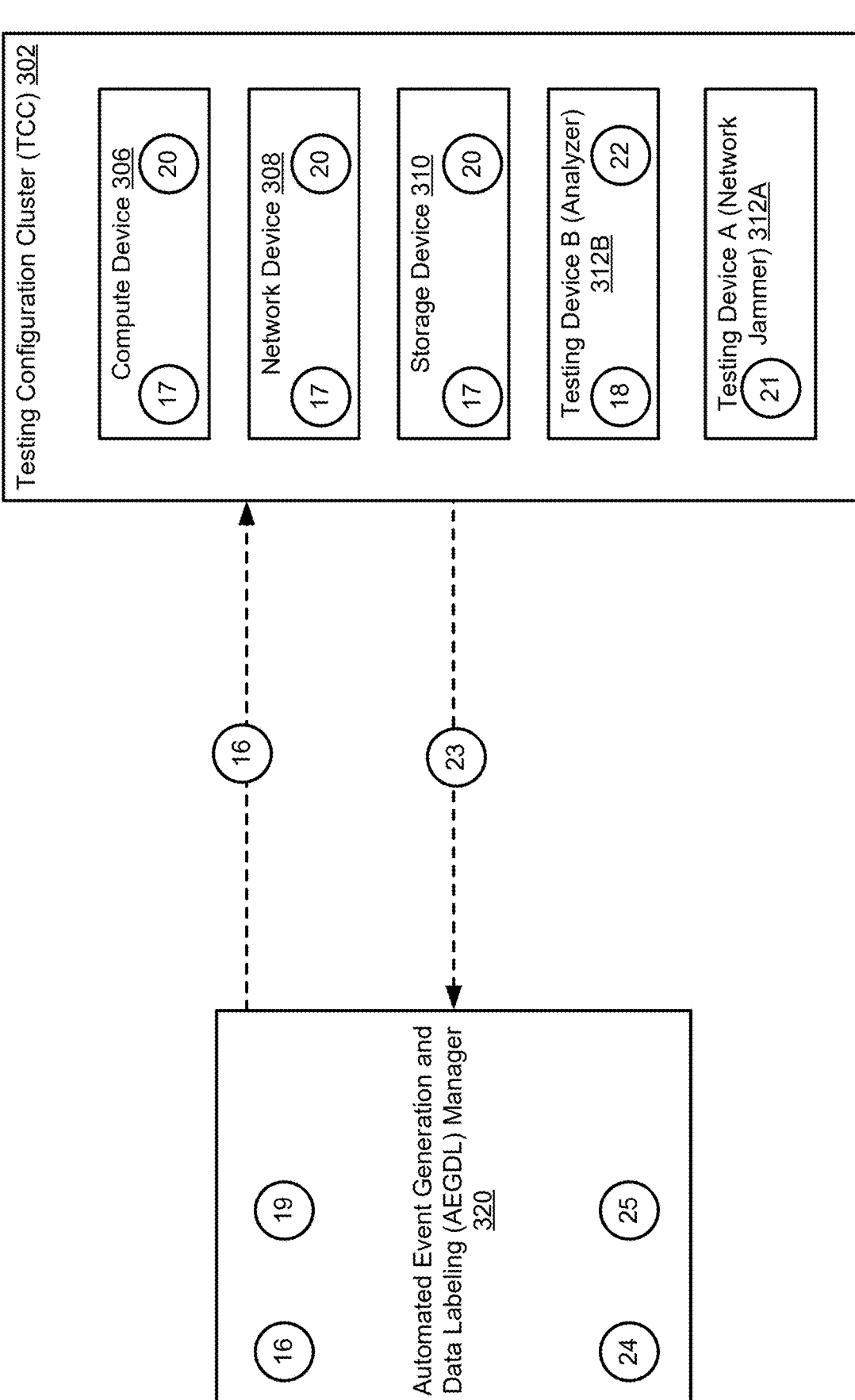
FIG. 3.3

ACCELERATED EVENT GENERATION FOR SUPERVISED LEARNING

BACKGROUND

Devices and/or components of devices are often capable of performing certain functionalities. During the performance of those functionalities, the devices and/or components may fail. It may be desirable to rectify the failures. To rectify the failures, the cause of the failures may be identified. Identifying the causes may include parsing information associated with the failures.

SUMMARY

In general, in one aspect, the embodiments disclosed herein relate to a method performed to generate testing information. The method includes identifying, by an automated event generation and data labeling (AEGDL) manager, a test case initiation event; in response to the identification: selecting a first test case of a plurality of test cases; identifying a first test configuration cluster (TCC) of a plurality of TCCs based on the test case; performing the first test case in the TCC; generating testing information based on the performing of the first test case in the TCC; and providing the testing information to prediction models for model training.

In general, in one aspect, the embodiments described herein relate to a method performed to generate testing information. The method includes identifying, by an automated event generation and data labeling (AEGDL) manager, a test case initiation event; in response to the identification: selecting a first test case of a plurality of test cases; identifying a first test configuration cluster (TCC) of a plurality of TCCs based on the test case; performing the first test case in the TCC, wherein performing the first test case in the TCC comprises: initiating telemetry collection associated with the first test case to generate telemetry information; confirming test configuration cluster configuration is in a required state based on the test case; performing a first iteration of iterations of the first test case; and resetting the first test configuration cluster; generating testing information based on the performing of the first test case in the TCC; and providing the testing information to prediction models for model training.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows a diagram of a test configuration cluster in accordance with one or more embodiments of the invention.

FIG. 1.3 shows a diagram of an automated event generation and data labeling manager in accordance with one or more embodiments of the invention.

FIG. 2.1 shows a method for generating training data using test cases in accordance with one or more embodiments of the invention.

FIG. 2.2 shows a method for performing a test case in a test configuration cluster in accordance with one or more embodiments of the invention.

FIGS. 3.1-3.3 show an example in accordance with one or more embodiments of the invention.

DETAILED DESCRIPTION

Figure 4:
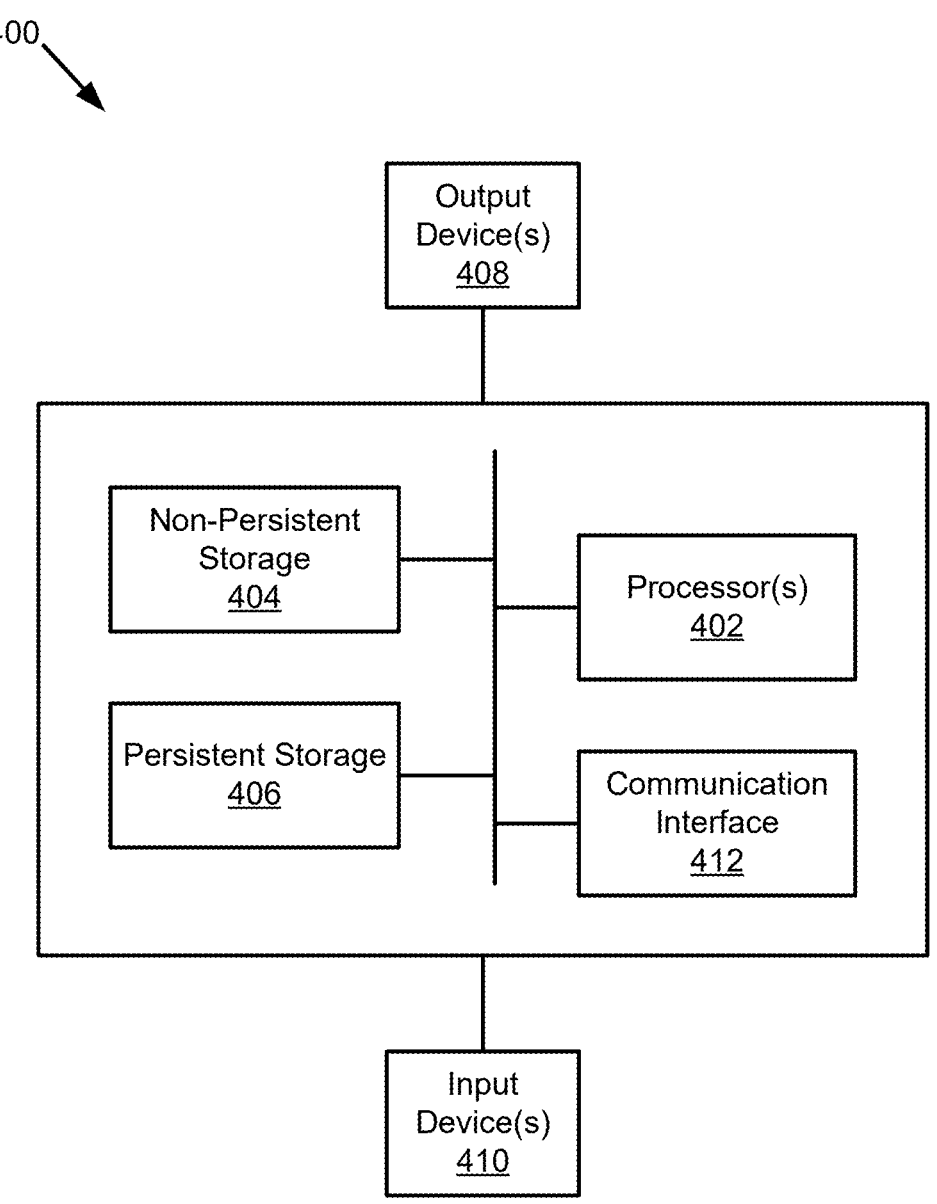
FIG. 4 shows a diagram of a computing device in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, data unavailable (DU) and data loss (DL) events are exceptionally disruptive to end users. Companies that specialize in data storage solutions or other computing environment offerings may do everything possible to prevent these types of events from occurring. However, despite best efforts, they still occur from time to time.

Because outages due to DU and DL events can cost end-users thousands of dollars per second (e.g., lost revenue), when events like these do happen, the immediate focus needs to be minimizing the time to resolution (TTR) (e.g., the time to resolve the outage). To this end, tools that will allow support personnel to rapidly determine what events may have led to the outage may be needed. By understanding the events that have recently impacted a customer's environment, manufacturers may potentially determine the best way to recover from these events.

As an example, a customer's production application crashed. The customer tried restarting the app several times, but it keeps crashing with "disk errors". At this point, the customer may pick up the phone and open a support case with a manufacturer's support center. Once the call has been received, the support center may attempt to triage the call by determining what portion of the infrastructure is responsible for the crash (i.e., compute, network, storage, etc.). As an assumption, because there are disk errors that the support center may decide to send the call to the storage array support team. Before the triage can start, the storage array support people will need some information about the host where the application was crashing (e.g., host bus adapter (HBA), World Wide Port Name (WWPN), or host NVMe qualified name (NQN)).

The storage platform team may determine that the array looks fine, but the HBA WWPN provided by the customer is not currently connected to the array (not currently logged in). At this point, the support case may be routed from the storage platform support team to the storage area network (SAN) support team. The SAN support team may start by trying to locate the HBA WWPN or Host NQN in the fabric. The SAN support team may notice the HBA or Host is logged into the fabric. Next, the SAN support team may check the zoning to ensure that the HBA or Host is still allowed to access the storage port(s) it was previously using to access those disks. The SAN support team may discover that the HBA or Host is no longer zoned to have access to the storage ports(s) it was previously accessing. The customer would be informed to update their zoning to allow the HBA or Host to access the appropriate storage port(s). Once the zoning is correctly updated, the application could be restarted, and any application clean up required could be performed before the system was returned to production. Each time the case is transferred from one team to another, time is added to the TTR (e.g., hours, days, etc.), context about the original problem is lost and the customer's confidence in the manufacturer as a valued supplier is shaken. A way to quickly determine potential causes for the failure event along with the steps that can be used to recover from the event may be imperative.

A common approach to providing the rapid event resolution required is to use an artificial intelligence (AI) or machine learning (ML) based approach to aid troubleshooting. As an example, such solutions may include an unsupervised training approach to determine what is "normal" for a particular environment and then will raise alerts for any conditions that seem unusual. Although this approach has proven to work well in production environments, the downside is that it currently requires enormous amounts of time to train the prediction model (e.g., weeks and months) before it starts producing valid insights about a particular computing environment. In addition, because this solution depends on monitoring actual traffic in the customer's environment, the problems that it can alert on are all specific to the configurations (e.g., network configurations) of the customer's environment so such solutions may not be able to easily adapt to changes in the customer environment or moving from one environment to the other. Also, if patterns change, false positives may be generated, and these may further delay resolving issues. Further, error events may occur anywhere in the storage protocol stack (e.g., from the host all the way through the network and to the storage), and most solutions fail to incorporate such errors.

To address, at least in part, the aforementioned issues, embodiments of the invention relate to methods and systems for performing test cases in test configuration clusters to generate testing information (e.g., a labeled dataset including telemetry information associated with an error scenario corresponding to the test case) and using the testing information to train prediction models to identify error scenarios using telemetry information in the same or similar configurations as the test configuration cluster that was used to generate the testing information. As a result of the processes discussed below, one or more embodiments disclosed herein advantageously ensure that: (i) a sufficient labeled dataset associated with error scenarios is efficiently generated; (ii) the testing information may be flexible enough to train prediction models to generate predictions for multiple cluster configurations; (iii) the testing information includes telemetry information associated with more than just the network fabric and includes compute devices and storage devices; and/or (iv) the time required to train an accurate prediction model may be greatly reduced using the testing information (a labeled training dataset) generated from the performance of a high volume of various test cases in various test configuration clusters. Accordingly, embodiments disclosed herein may use a supervised learning approach to train a prediction model by directly causing a specific event to happen (the label) and then monitor the log output of the compute, network and storage devices and record the symptoms that the event generates with the label. The symptoms for each event type may be unique and therefore could be used as a kind of "fingerprint" to detect similar events that may happen in a customer's environment later.

The following describes various embodiments of the invention.

FIG. 1.1 shows a diagram of a system (100) in accordance with one or more embodiments of the invention. The system (100) includes any number of test configuration clusters (TCCs) (102) (e.g., TCC A (102A), TCC B (102B), TCC N (102N), etc.), an automated event generation and data labeling (AEGDL) manager (120), and one or more networks (140). The system (100) may facilitate, at least, the generation of training data through the execution of test cases in the TCCs (102). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the TCCs (e.g., 102A, 102B, etc.), the AEGDL manager (120), and the network (140) may be (or may include) physical hardware or logical devices, as discussed below. While FIG. 1.1 shows a specific configuration of the system (100), other configurations may be used without departing from the scope of the invention. For example, although the TCCs (e.g., 102A, 102B, etc.) and the AEGDL manager (120) are shown to be operatively connected through a communication network (e.g., 140), the TCCs (e.g., 102A, 102B, etc.) and the AEGDL manager (120) may be directly connected (e.g., without an intervening communication network).

Further, functioning of the TCCs (e.g., 102A, 102B, etc.) and the AEGDL manager (120) is not dependent upon the functioning and/or existence of the other components (e.g., devices) in the system (100). Rather, the TCCs (e.g., 102A, 102B, etc.) and the AEGDL manager (120) may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing data, a cloud computing infrastructure, etc.) and may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of the TCCs (e.g., 102A, 102B, etc.) and the AEGDL manager (120). The system (100) may also represent a comprehensive middleware layer executing on computing devices (e.g., 400, FIG. 4) that supports virtualized application and storage environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

In one or more embodiments, the system (100) may provide computer-implemented services to the users. To provide computer-implemented services to the users, the system (100) may perform some computations (e.g., data collection, distributed processing of collected data, etc.) locally (e.g., at the users' site using one or more clients (not shown)) and other computations remotely (e.g., away from the users' site using the TCCs (102)) from the users. By doing so, the users may utilize different computing devices (e.g., 400, FIG. 4) that have different quantities of computing resources (e.g., processing cycles, memory, storage, etc.) while still being afforded a consistent user experience for testing purposes. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a TCC (described below) or client (not shown) operatively connected to the TCCs (102). The resource may be delivered to the TCC or client via, for example (but not limited to): conventional installation, a method for streaming, a VM executing on a remote computing device, execution from a removable storage device connected to the client (such as universal serial bus (USB) device), etc.

In one or more embodiments, the TCCs (102) may be configured to include any quantity of TCCs. For example, the TCCs (102) may include TCC A (102A), TCC B (102B), and TCC N (102N). Each TCC (e.g., 102A, 102B, 102N) my include a different configuration of computing environments (e.g., computing power and storage) whereon workloads may be implemented (to provide computer-implemented services). A configuration of computing environment may include: (i) a unique configuration of computing devices, (ii) configuration and type of computing device components, (iii) configuration and versions of resources (e.g., software programs), (iv) execute various workloads, etc. Each TCC may be used to generate testing information associated with failure scenarios in different configurations of computing environments. In one or more embodiments, each component of the TCCs (102) may be operably/operatively connected to any of the other components of the TCCs (102) and/or the system (100) via any combination of wired and/or wireless connections. The TCCs (102) may include other and/or additional components, such as a backup storage system (not shown), a persistent volume pool (not shown), communication services (not shown), etc., without departing from embodiments disclosed herein.

Details of a TCC (e.g., 102A) are described below in reference to FIGS. 1.2.

In one or more embodiments, the each of the TCCs (e.g., 102A, 102B, 102N) may be configured to execute one or more workloads to provide the computer-implemented services for testing failure scenarios. As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor (e.g., a manufacturer, a trusted third-party vendor, etc.) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements (e.g., if the RPO is set to 1-hour, the corresponding backup operation should be performed again within 1-hour after the start time of the last backup operation of an object), recovery time objective (RTO) requirements, etc. In most cases, the user may be agnostic as to which particular target devices are used, as long as the user performance requirements are satisfied.

As used herein, a "file system" is a method that an OS (e.g., Microsoft® Windows, Apple® MacOS, etc.) uses to control how data is named, stored, and retrieved. For example, once a user has logged into a computing device (e.g., 400, FIG. 4), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, the AEGDL manager (120) may include functionality to perform test case management services. The test case management services may include, e.g.: (i) initiate performance of test cases on the TCCs (102), (ii) update TCC configurations based on the test case performed, (iii) obtain testing information associated with the performance of the tests cases, and/or (iv) provide the testing information to external entities (e.g., clients (not shown)) to train prediction models to predict failure scenarios such as or similar to those caused by the test cases in the TCCs (102). For additional information regarding the functionality of the AEGDL manager (120), refer to FIGS. 2.1-2.2.

In one or more embodiments, AEGDL manager (120) may be a physical or logical computing device configured for hosting one or more workloads, or for providing a computing environment whereon workloads may be implemented. The AEGDL manager (120) may provide computing environments that are configured for, at least: (i) workload placement collaboration, (ii) computing resource (e.g., processing, storage/memory, virtualization, networking, etc.) exchange, and/or (iii) protecting workloads (including their applications and application data) of any size and scale (based on, for example, one or more SLAs configured by users).

As being a physical or logical computing device, the AEGDL manager (120) may oversee TCC (e.g., 102A, 102B, 102N) operations and issue requests or other communications to perform test cases or update the configuration of the TCCs (102). To this end, to provide services to the users of the AEGDL manager (120), the AEGDL manager (120) may utilize, rely on, or otherwise cooperate with the TCCs (102) (e.g., by interfacing with a TCC (e.g., 102A) via the TCC node interface (not shown)). For example, a client may issue a request (e.g., a request to perform a test case, a request to select and configure a TCC (e.g., 102A) to perform the test case, etc.) to a TCC (e.g., 102A) to receive responses and interact with various components of the TCC (e.g., 102A). The AEGDL manager (120) may also request data from and/or send data to the TCCs (102) (for example, a TCC (e.g., 102A) may transmit monitoring information during the performance of a test case to the AEGDL manager (120) that allows AEGDL manager (120) to generate testing information, the results of which are used by clients to train failure prediction models).

As described above, the AEGDL manager (120) may provide test case management services to users (and/or other computing devices such as the TCCs (102)). The AEGDL manager (120) may provide any number and any type of other computer-implemented services without departing from embodiments disclosed herein. To provide computer-implemented services, the AEGDL manager (120) may include a collection of physical components (e.g., processing resources, storage/memory resources, networking resources, etc.) configured to perform operations of the AEGDL manager (120) and/or otherwise execute a collection of logical components (e.g., virtualization resources) of the AEGDL manager (120).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a DPU, a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), PMEM, virtualized storage, virtualized memory, etc.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface the AEGDL manager (120) with external entities (e.g., the TCCs (102)) and to allow for the transmission and receipt of data with those entities. A networking resource may communicate via any suitable form of wired interface (e.g., Ethernet, fiber optic, serial communication, etc.) and/or wireless interface, and may utilize one or more protocols (e.g., the TCP, the UDP, Remote Direct Memory Access (RDMA), IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other entities (e.g., TCCs 102). For example, when utilizing RDMA to access data on another entity, it may not be necessary to interact with the logical components of that entity. Rather, when using RDMA, it may be possible for the networking resource to interact with the physical components of that entity to retrieve and/or transmit data, thereby avoiding any higher-level processing by the logical components executing on that entity.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a vCPU, a virtual storage pool, etc.

In one or more embodiments, a virtualization resource may include a hypervisor (e.g., a VM monitor), in which the hypervisor may be configured to orchestrate an operation of, for example, a VM by allocating computing resources of the AEGDL manager (120) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, the AEGDL manager (120) may be implemented as a computing device (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the AEGDL manager (120) may also be implemented as a logical device.

In one or more embodiments, users may interact with (or operate) the AEGDL manager (120) in order to perform tasks (e.g., upload data, initiate test cases, etc.). In one or more embodiments, accessibility of users to the AEGDL manager (120) may depend on a regulation set by an administrator of the AEGDL manager (120). To this end, each user may have a personalized user account that may, for example, grant access to certain data, applications, and computing resources of the AEGDL manager (120). This may be realized by implementing the virtualization technology. In one or more embodiments, an administrator may be a user with permission (e.g., a user that has root-level access) to make changes on the AEGDL manager (120) that will affect other users of the AEGDL manager (120).

In one or more embodiments, for example, a user may be automatically directed to a login screen of a client when the user connected to the AEGDL manager (120). Once the login screen of the AEGDL manager (120) is displayed, the user may enter credentials (e.g., username, password, etc.) of the user on the login screen. The login screen may be a GUI generated by a visualization module (not shown) of the AEGDL manager (120). In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read, view, parse, interact with, etc.) the listed information.

For additional information regarding the AEGDL manager (120), refer to FIGS. 1.3-2.2.

In one or more embodiments, all, or a portion, of the components of the system (100) may be operatively connected each other and/or other entities via any combination of wired and/or wireless connections. For example, the aforementioned components may be operably connected, at least in part, via the network (140). Further, all, or a portion, of the components of the system (100) may interact with one another using any combination of wired and/or wireless communication protocols.

In one or more embodiments, the network (140) may represent a (decentralized or distributed) computing network and/or fabric configured for computing resource and/or messages exchange among registered computing devices (e.g., the AEGDL manager (120), TCCs (e.g., 102, 102A, 102B, 102N), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (140) may enable interactions between, for example, the TCCs (e.g., 102, 102A, 102B, 102N), TCC components (discussed below), and the AEGDL manager (120) through any number and type of wired and/or wireless network protocols (e.g., TCP, UDP, IPv4, etc.).

The network (140) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (140) and its subcomponents may be implemented using hardware, software, or any combination thereof.

In one or more embodiments, before communicating data over the network (140), the data may first be broken into smaller batches (e.g., data packets) so that larger size data can be communicated efficiently. For this reason, the network-enabled subcomponents may break data into data packets. The network-enabled subcomponents may then route each data packet in the network (140) to distribute network traffic uniformly.

In one or more embodiments, the network-enabled subcomponents may decide how real-time (e.g., on the order of ms or less) network traffic and non-real-time network traffic should be managed in the network (140). In one or more embodiments, the real-time network traffic may be high-priority (e.g., urgent, immediate, etc.) network traffic. For this reason, data packets of the real-time network traffic may need to be prioritized in the network (140). The real-time network traffic may include data packets related to, for example (but not limited to): videoconferencing, web browsing, voice over Internet Protocol (VoIP), etc.

While FIG. 1.1 shows a configuration of components, other system configurations may be used without departing from the scope of the invention.

Turning now to FIG. 1.2, FIG. 1.2 shows a diagram of a test configuration cluster (TCC), TCC A (102A) in accordance with one or more embodiments of the invention. TCC A (102A) may be an embodiment of the TCCs (102, FIG. 1.1) discussed above. TCC A (102A) may include devices under test (DUTs) (104) and testing devices (112). The DUTs (104) and the testing devices (112) may be operatively/operably connected to each other or any other components or external entities (e.g., AEGDL manager (120), FIG. 1.1) via the network (140). TCC A (102A) may include additional, fewer, and/or different components without departing from the scope of the invention. Each component illustrated in FIG. 1.2 is discussed below.

In one or more embodiments, the DUTs (104) include devices that perform one or more test cases. To perform the test cases, the DUTs (104) may execute one or more workloads, services, supplication, jobs, etc. specified by the test cases for test users, experience a failure scenario during the execution (e.g., caused by the testing devices (112), testing users, etc.), and continue the execution as specified by the test cases. The DUTs (104) may include one or more compute devices (e.g., compute device A (106A), compute device N (106N)), one or more network devices (e.g., network device A (108A), network device N (108N)), and one or more storage devices (e.g., storage device A (110A), storage device N (110N)). The DUTs (104) may include other and/or additional types of devices without departing from embodiments disclosed herein. Each of the aforementioned devices is discussed below.

In one or more embodiments, as being a physical computing device or a logical computing device, a compute device (e.g., 106A, 106N) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, database services, electronic communication services, data protection services, etc.) to one or more entities (e.g., users, components of the system (100), etc.), (iv) exchanging data with other components registered in/to the network (140) in order to, for example, participate in a collaborative workload placement and for executing test cases, and/or (v) operating as a standalone device. In one or more embodiments, in order to read, write, or store data, a compute device (e.g., 106A, 106N) may communicate with, for example, the AEGDL manager (e.g., 120, FIG. 1.1), other compute devices (e.g., 106A, 106N, etc.), network devices (e.g., 108A, 108N), storage devices (e.g., 110A, 110N), and/or other entities/ components. A compute device (e.g., 106A) may include more computing resources (e.g., CPUs, GPUs, DPUs, memory, etc.) than a storage device (e.g., 110A) or a network device (e.g., 108A).

In one or more embodiments, as being a physical computing device or a logical computing device, a network device (e.g., 108A, 108N) may be configured for, e.g.: (i) connecting one or more devices to the network (140), (ii) send/receive communications between devices, (iii) implementing one or more network protocols or standards, (iv) authenticating communications, (v) packetizing data for transmission between devices, etc. The network devices (e.g., 108A, 108N) may include other and/or additional functionalities without departing from embodiments disclosed herein. A network device (e.g., 108A) may include more network resources than a compute device (e.g., 106A) or a storage device (e.g., 110A).

In one or more embodiments, as being a physical computing device or a logical computing device, a storage device (e.g., 110A, 110N) may be configured for, e.g.: (i) storing data obtained from other devices (e.g., compute devices, network devices, AEGDL manager (120, FIG. 1.1), etc.), (ii) providing stored data to other devices (e.g., compute devices, network devices, AEGDL manager (120, FIG. 1.1), etc.), (iii) performing archiving and data staging, (iv) implementing retention policies and deleting data according to the retention policies, etc. The storage devices (e.g., 110A, 110N) may include other and/or additional functionalities without departing from embodiments disclosed herein. A storage device (e.g., 110A) may include more storage, storage space, and other storage resources than a compute device (e.g., 106A) or a network device (e.g., 108A).

Returning to the discussion of the DUTs (104), in one or more embodiments, the DUTs (104) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, a DUT (104) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

Further, while a single DUT (104) (e.g., 106A, 108A, 110A, etc.) device is considered above, the term "system" includes any collection of systems or sub-systems that individually or jointly execute a set, or multiple sets, of instructions to provide one or more computer-implemented services. For example, a single DUT may provide a computer-implemented service on its own (i.e., independently) while multiple other DUTs may provide a second computer-implemented service cooperatively (e.g., each of the multiple other devices may provide similar and/or different services that form the cooperatively provided service).

In one or more embodiments, the instructions may embody one or more of the methods or logic, including the methods discussed below in FIGS. 2.1-2.2. In a particular embodiment, the instructions may reside completely, or at least partially, within a storage/memory resource (of, for example, a compute device (e.g., 106A) the AEGDL manager (120, FIG. 1.1)), and/or within a processor (of, for example, a compute device (e.g., 106A) the AEGDL manager (120, FIG. 1.1))) during execution.

To provide any quantity and any type of computer-implemented services, a DUT (104) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a central processing unit (CPU), a graphics processing unit (GPU), a data processing unit (DPU), a network resource, storage space/source (e.g., to store any type and quantity of information), storage I/O, and a memory resource, etc.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, a GPU may refer to an electronic circuitry that may provide parallel data processing capabilities to generate enhanced, real-time graphics and to perform accelerated computing tasks (which is particularly useful for machine learning (ML) related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, a DPU may refer to an electronic circuitry that may perform accelerated data processing and optimized data movement within the cluster (102). In one or more embodiments, a DPU may include, for example (but not limited to): a high-speed networking interface (e.g., 200 gigabits per second (200 Gb/s)), dynamic RAM (DRAM), multi-core (e.g., 8-core) CPU, programmable acceleration engines (particularly for ML, security, and telecommunications purposes), etc.

In one or more embodiments, a memory resource may be any hardware component that is used to store data in a computing device (e.g., 400, FIG. 4). The data stored in a memory resource may be accessed almost instantly (e.g., in milliseconds (ms)) regardless of where the data is stored in the memory resource. In most cases, a memory resource may provide the aforementioned instant data access because the memory resource may be directly connected to a CPU on a wide and fast bus connection (e.g., a high-speed internal connection that transfers data between the hardware components of a computing device).

In one or more embodiments, a memory resource may be (or may include), for example (but not limited to): DRAM (e.g., DDR4 DRAM, error correcting code (ECC) DRAM, etc.), persistent memory (PMEM) (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, storage space (or simply "storage") may refer to a hardware component that is used to store data in a computing device (e.g., 400, FIG. 4). In one or more embodiments, storage may be a physical computer-readable medium. For example, storage may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, a DUT (104) may split up a request (e.g., an operation, a task, an activity, etc.) with another component (e.g., another DUT (104), a testing device (112), an AEGDL manager (120, FIG. 1.1)) of the system (100), coordinating its efforts to complete the request more efficiently than if the DUT had been responsible for completing the request. A request may be, for example (but not limited to): a web browser search request, a representational state transfer (REST) request, a computing request, a database management request, a registration request, a file upload/download request, etc. To provide computer-implemented services to one or more entities, a node may perform computations locally and/or remotely. By doing so, the node may utilize different computing devices (e.g., 400, FIG. 4) that have different quantities of computing resources to provide a consistent experience to the entities. In one or more embodiments, the DUTs (104) may be a heterogeneous set, including different types of hardware components, applications, services, different types of OSs, etc.

In one or more embodiments, a DUT (104) may host any number of applications (and/or content accessible through the applications) that provide application services to user (e.g., test users). Application services may include, for example (but not limited to): instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in a DUT (104). In one or more embodiments, applications may be logical entities executed using computing resources of a DUT (104). For example, applications may be implemented as computer instructions, e.g., computer code, stored on persistent storage of a node that when executed by the processor(s) of the DUT (104), cause the DUT (104) to provide the functionality of the applications described throughout the application.

In one or more embodiments, while performing, for example, one or more operations requested by a user of TCC A (102), applications installed on a DUT (104) may include functionality to request and use resources (e.g., data, metadata, computing resources, etc.) of the DUT (104). Applications may also perform other types of functionalities not listed above without departing from the scope of the invention. In one or more embodiments, while providing application services to a user, applications may store (temporarily or permanently) data that may be relevant to the user in persistent storage of the DUT (104).

In one or more embodiments, in order to provide the above-mentioned functionalities, a DUT (104) may need to communicate with other components of the system (100) with minimum amount of latency (e.g., with high-throughput (e.g., a high data transfer rate) and sub-ms latency). For this reason, REST application programming interfaces (REST APIs) may be used to enable communication(s) between the DUT (104) and other components.

While the DUTs (104) have been illustrated and described as including a limited number of specific components and/or hardware resources, the DUTs (104) may include additional, fewer, and/or different components without departing from the scope of the invention. One of ordinary skill will appreciate that the DUTs (104) may perform other functionalities without departing from the scope of the invention.

In one or more embodiments, a DUT (104) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the DUT (104) described throughout this application.

Alternatively, in one or more embodiments, the DUT (104) may be implemented as a logical device. The logical device may utilize the computing resources of any number of computing devices to provide the functionality of the DUT (104) described throughout this application.

In one or more embodiments, testing devices (112) include one or more devices (e.g., testing device A (112A), testing device N (112N), etc.) that include the functionality to induce error scenarios according to test cases in DUTs (104) and monitor the performance of DUTs (104) before, during, and/or after the error scenarios are induced. The error scenarios may include any type of error scenarios that may occur in a computing environment without departing from embodiments disclosed herein. The error scenarios may include, for example, power failures, device disconnections, network errors, bit flips, software upgrade failures, data corruptions, malicious software attacks, incompatible software versions, etc. The testing devices (112) may include the functionality to monitor the performance of the DUTs (104) and generate telemetry information and logs specifying the performance of the DUTs (104) during the performance of test cases. The testing devices (112) may perform monitoring to generate or obtain telemetry information and logs using any appropriate monitoring techniques without departing from embodiments disclosed herein. The testing devices (112) may provide the telemetry information and logs to the AEGDL manager (120, FIG. 1.1) to generate testing information associated with the test cases. In one or more embodiments, a single testing device (e.g., 112A) may induce error scenarios on DUTs (104) or monitor performances of DUTs (104). In alternative embodiments, a single testing device (e.g., 112A) may both induce error scenarios on DUTs (104) and monitor performances of DUTs (104). In one or more embodiments, the testing devices (112) may include any devices capable of inducing error scenarios without departing from embodiments disclosed herein. The error inducing devices may include, for example, network jammers, power controllers, component removers, load generators, upgrade managers, network throttlers, data corrupters, data maskers, etc. The testing devices (112) may include other and/or additional functionalities without departing from embodiments disclosed herein.

In one or more embodiments, the testing devices (112) may be implemented as a one or more computing devices (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the testing devices (112) described throughout this application.

Alternatively, in one or more embodiments, the testing devices (112) may be implemented as one or more logical devices. The logical device may utilize the computing resources of any number of computing devices to provide the functionality of the testing devices (112) described throughout this application.

In one or more embodiments, the network (140) is an embodiment of the network described above in FIG. 1.1. For additional information regarding the network, refer to FIG. 1.1 above.

While FIG. 1.2 shows a configuration of components, other system configurations may be used without departing from the scope of the invention.

Turning now to FIG. 1.3, FIG. 1.3 shows a diagram of an AEGDL manager (120) in accordance with one or more embodiments of the invention. As discussed above, the AEGDL manager (120) may perform test case management services for the TCCs (102, FIG. 1.1) and/or users. To perform the aforementioned test case management services, the AEGDL manager (120) may include an AEGDL controller (122) and storage (124). The AEGDL manager (120) may include additional, fewer, and/or different components without departing from the scope of the invention. Each component may be operably connected to any of the other components via any combination of wired and/or wireless connections. Each component illustrated in FIG. 1.3 is discussed below.

In one or more embodiments, the AEGDL controller (122) may include the functionality to perform the test case management services of the AEGDL manager (120). The AEGDL controller (122) may maintain a test case repository (126, discussed below), a test case parameters repository (128, discussed below), and a test configuration clusters repository (130, discussed below) in the storage (124). The AEGDL controller (122) may update the test case repository (126, discussed below), a test case parameters repository (128, discussed below), and a test configuration clusters repository (130, discussed below) using information obtained from users and/or the TCCs (102). The functionality of the AEGDL controller (122) is described further in the methods of FIGS. 2.1-2.2. The AEGDL controller (122) may include other and/or additional functionalities without departing from embodiments disclosed herein.

In one or more embodiments, the AEGDL controller (122) may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the AEGDL controller (122). Alternatively, in one or more of embodiments, the AEGDL controller (122) may be implemented as computer instructions stored on storage/memory resources of the AEGDL manager (120) that when executed by processing resources of the AEGDL manager (120), cause the AEGDL manager (120) to provide the functionality of the AEGDL controller (122).

In one or more embodiments, the storage (124) may include the functionality to store and provide information. The storage (124) may include other and/or additional functionalities without departing from embodiments disclosed herein. The storage (124) may include any quantity and/or type of storage and/or memory resources discussed above in FIG. 1.2. In one or more embodiments, the storage (124) may include a test case repository (126), a test case parameters repository (128), and a test configuration clusters repository (130). The storage (124) may include other and/or additional information without departing from embodiments disclosed herein. Each of the aforementioned types of information stored in the storage (124) is discussed below.

In one or more embodiments, the test case repository (126) may include one or more documents that include a list of test cases. The list of test cases may include test case identifiers (e.g., a unique combination of alphanumeric characters) associated with the test cases. A test case description may be associated with each test case identifier in the test case repository (126). The test case description may include information describing the test case. The information may specify the application, workloads, error scenarios, and/or other information associated with the corresponding test case without departing from embodiments disclosed herein. In one or more embodiments, the test cases in the test case repository (126) may be performed in the order in which the test cases are placed in the list. In one or more embodiments, the test case repository (126) may be generated by an external entity (e.g., a third-party computing device) or a user of the system (100, FIG. 1.1) and provided to the AEGDL manager (120). Additionally, the external entity (e.g., a third-party computing device) or user of the system (100, FIG. 1.1) may provide information and requests to update the test case repository (126) (e.g., add new test cases, delete test cases, modify test cases, etc.). The AEGDL manager (120) may use the test case repository (126) to perform test cases as discussed in FIGS. 2.1-2.2. The test case repository (126) may include other and/or additional information without departing from embodiments disclosed herein.

In one or more embodiments, the test case parameters repository (128) may include one or more data structures that include information specifying requirements for performing test cases. The information may include entries associated with each test case. The test case entries may include the test case identifier and the requirements associated with the corresponding test case. The requirements may include a configuration (e.g., type, quantity, topology, etc.) of test configuration cluster devices (e.g., compute devices, network devices, storage devices, and/or testing devices), software/firmware types and versions, network protocols, device component types and configurations, data, authentication policies, operating system types and versions, test pass and test fail criteria (e.g., information specifying when a test case fails or when a test case passes such as a performance threshold), number of test iterations, and/or any other requirements for performing test cases without departing from embodiments disclosed herein. In one or more embodiments, the test case parameters repository (128) may be generated by an external entity (e.g., a third-party computing device) or a user of the system (100, FIG. 1.1) and provided to the AEGDL manager (120). Additionally, the external entity (e.g., a third-party computing device) or user of the system (100, FIG. 1.1) may provide information and requests to update the test case parameters repository (128) (e.g., add new test case parameters, delete test case parameters, modify test case parameters, etc.). The AEGDL manager (120) may use the test case parameters repository (128) to perform test cases as discussed in FIGS. 2.1-2.2. The test case parameters repository (128) may include other and/or additional information without departing without departing from embodiments disclosed herein.

In one or more embodiments, the test configuration clusters repository (130) may include one or more data structures that include test configuration cluster entries. Each test configuration cluster entry may include information associated with each corresponding TCC (e.g., 102A, 102B, 102N, etc.) of the TCCs (102, FIG. 1.1). The information may include, for the corresponding TCC (e.g., 102A) a configuration (e.g., type, quantity, topology, etc.) of test configuration cluster devices (e.g., compute devices, network devices, storage devices, and/or testing devices), software/firmware types and versions, network protocols, device component types and configurations, data, authentication policies, operating system types and versions, communication information (e.g., network addresses, username/password, encryption keys/certificates, etc.) and/or any other information associated with the corresponding TCC (e.g., 102A). In one or more embodiments, the test configuration clusters repository (130) information may be generated by a TCC (e.g., 102A) and provided to the AEGDL manager (120). The corresponding TCC (e.g., 102A) may provide information and requests to update the test configuration clusters repository (130) (e.g., add new test configuration cluster entry, delete test configuration cluster entry, modify configuration cluster entry, etc.). Alternatively, all or a portion of the test configuration clusters repository (130) information may be generated by an external entity (e.g., a third-party computing device) or a user of the system (100, FIG. 1.1) and provided to the AEGDL manager (120). Additionally, the external entity (e.g., a third-party computing device) or user of the system (100, FIG. 1.1) may provide information and requests to update the test configuration clusters repository (130) (e.g., add new test configuration cluster entry, delete test configuration cluster entry, modify configuration cluster entry, etc.). The AEGDL manager (120) may use the test configuration clusters repository (130) to perform test cases as discussed in FIGS. 2.1-2.2. The test configuration clusters repository (130) may include other and/or additional information without departing without departing from embodiments disclosed herein.

While the data structures (e.g., 126, 128, 130) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (124), any of the aforementioned data structures may be stored in different locations (e.g., in storage of other computing devices) and/or spanned across any number of computing devices without departing from embodiments disclosed herein. The data structures discussed in this Detailed Description may be implemented using any type of data structure including, for example, file systems, lists, linked lists, tables, unstructured data, databases, etc.

While FIG. 1.3 shows a configuration of components, other system configurations may be used without departing from the scope of the invention.

FIG. 2.1 shows a method for generating training data using test cases in accordance with one or more embodiments of the invention.in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.1, the method shown in FIG. 2.1 may be executed by, for example, an AEGDL manager (e.g., 120, FIG. 1.1). Other components of the system (100) illustrated in FIG. 1.1 may also execute all or part of the method shown in FIG. 2.1 without departing from the scope of the invention.

In Step 200, a testing initiation event is identified. In one or more embodiments, the AEGDL manager may identify the testing initiation event. In one embodiment, the testing initiation event may include obtaining a request from a user (e.g., an end user of a client operatively connected to the AEGDL manager). The request may be obtained using any appropriate method for data transmission without departing from embodiments disclosed herein. For example, the user (via a client) may send the request as a message including one or more packets through one or more network devices that operatively connect the AEGDL manager to the client.

In alternative embodiments, the testing initiation event may include the initial deployment of the AEGDL manager and the TCCs. Upon power on or initial deployment, the AEGDL manager may identify the testing initiation event and begin executing test cases in the test case repository on the TCCs.

In yet additional alternative embodiments, the testing initiation event may include the occurrence of a point in time specified by a testing schedule. The testing schedule may refer to one or more data structures that includes one or more points in time for performing the test cases in the test case repository.

The testing initiation event may be identified via other and/or additional methods without departing from embodiments disclosed herein.

In Step 202, a test case is selected from the test case repository. In one or more embodiments, the AEGDL manager may select a test case from the test case repository. The AEGDL manager may track the test cases selected in the test case repository during an iteration of performing test cases. The AEGDL manager may select test cases in the order of the list of test cases in the test case repository. In alternative embodiments, AEGDL manager may select test cases in random order. The AEGDL manager may select test cases in any order without departing from embodiments disclosed herein. The test case may be selected from the test case repository via other and/or additional methods without departing from embodiments disclosed herein.

In Step 204, test case parameters associated with the test case are obtained from the test case parameters repository. In one or more embodiments, the AEGDL manager may obtain the test case identifier associated with the selected test case. The AEGDL manager may then search the test case parameters repository for an entry that includes the identified test case identifier. After identifying the entry associated with the test case using the identified test case identifier, the AEGDL manager may then obtain the test case parameters included in the entry. The test case parameters associated with the test case may be obtained from the test case parameters repository via other and/or additional methods without departing from embodiments disclosed herein.

In Step 206, a test configuration cluster is identified to perform the test case. In one or more embodiments, the AEGDL manager may use the test case parameters associated with the selected test case to identify the test configuration cluster to perform the test case. In one embodiment, the test case parameters may directly specify a TCC to perform the test case (e.g., may include the TCC identifier associated with the TCC). In alternative embodiments, the test case parameters may specify one or more requirements (e.g., TCC component types and configurations, software (e.g., applications) and firmware, data, etc.) for performing the test case. The AEGDL manager may search the test cluster configuration repository for an entry associated with a TCC that satisfies the requirements. The AEGDL manager may identify the TCC associated with the entry that includes test configuration cluster information that satisfies the test case requirements of the test case parameters as the TCC to perform the test case. The test configuration cluster may be identified to perform the test case via other and/or additional methods without departing from embodiments disclosed herein.

In Step 208, a test configuration cluster information is obtained. In one or more embodiments, the AEGDL manager may obtain test configuration cluster information specifying the state of the TCC. The test configuration cluster information specifying the state of the TCC may include, for example, software and firmware versions, data stored in the TCC, devices connected in the TCC, etc. The AEGDL manager may obtain the test configuration information from the test configuration cluster repository entry associated with the TCC. Alternatively, the AEGDL manager may request and obtain the test configuration cluster information from the TCC (or a component therein). The test configuration cluster information may be obtained using any appropriate method for data transmission without departing from embodiments disclosed herein. For example, the TCC may send the test configuration cluster information as a message including one or more packets through one or more network devices that operatively connect the AEGDL manager to the TCC. The test configuration cluster information may be obtained via other and/or additional methods without departing from embodiments disclosed herein.

In Step 210, a determination is made as to whether a configuration update is required. In one or more embodiments, the AEGDL manager may compare the test configuration cluster information specifying the current state of the TCC with the test case parameters that specify the required state of the TCC to perform the test case to identify any discrepancies or mismatches. In one or more embodiments disclosed herein, if there are any discrepancies in the test configuration cluster information specifying the current state of the TCC with the test case parameters that specify the required state of the TCC to perform the test case, then the AEGDL manager may determine that a configuration update is required. In one or more embodiments disclosed herein, if there are no discrepancies in the test configuration cluster information specifying the current state of the TCC with the test case parameters that specify the required state of the TCC to perform the test case, then the AEGDL manager may determine that a configuration update is not required. The determination as to whether a configuration update is required may be made via other and/or additional methods without departing from embodiments.

In one or more embodiments disclosed herein, if it is determined that a configuration update is required, then the method proceeds to Step 212. In one or more embodiments disclosed herein, if it is determined that a configuration update is not required, then the method proceeds to Step 214.

In Step 212, the test configuration cluster is updated based on the test case parameters. In one or more embodiments, AEGDL manager may initiate the update of the TCC based on the discrepancies identified above in Step 212. The AEGDL manager may send a request to the TCC to perform one or more updates to match the state of the TCC specified by the test case parameters. In response to obtaining the request, one or more components of the TCC may perform the updates specified by the request. The updates may include, for example, updating software/firmware versions, obtaining/generating required data, connecting/removing devices in the TCC, etc. The TCC may notify the AEGDL manager when the test configuration cluster update is complete. The test configuration cluster may be updated based on the test case parameters via other and/or additional methods without departing from embodiments disclosed herein.

In Step 214, the test case is performed in the test configuration cluster. In one or more embodiments disclosed herein, the test case may be performed in the test configuration cluster via the methods discussed in FIG. 2.2. For additional information regarding performing the test case in the test configuration cluster, refer to FIG. 2.2.

In Step 216, a determination is made as to whether there are additional test cases. As discussed above, the AEGDL manager may track the test cases performed during an iteration of performing the test cases in the test case repository. In one or more embodiments disclosed herein, if there is a test case that has not been selected, then the AEGDL manager may determine that the there are additional test cases. In one or more embodiments disclosed herein, if all of the test cases have been selected, then the AEGDL manager may determine that the there are no additional test cases. The determination as to whether there are additional test cases may be made via other and/or additional methods without departing from embodiments disclosed herein.

In one or more embodiments disclosed herein, if it is determined that there are additional test cases, then the method proceeds to Step 202. In one or more embodiments disclosed herein, if it is determined that there are no additional test cases, then the method proceeds to Step 218.

In Step 218, testing information is provided to prediction models for error prediction model training. In one or more embodiments, the AEGDL manager may provide the generated testing information associated with all test cases to entities (not shown in FIG. 1.1) that perform prediction model training. The prediction models may include any type of artificial intelligence, machine learning, or other types of data analytics models without departing from embodiments disclosed herein. The entities may use the testing information to train one or more prediction models to identify error scenarios associated with the test cases in clusters with similar or the same configurations as the TCCs in which the test case. Accordingly, by using the generated and labeled testing information, the prediction model accuracy and efficiency of prediction model training may be greatly improved.

In one or more embodiments, the method may end following Step 218.

FIG. 2.2 shows a method for performing a test case in a test configuration cluster in accordance with one or more embodiments of the invention.in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.2, the method shown in FIG. 2.2 may be executed by, for example, an AEGDL manager (e.g., 120, FIG. 1.1). Other components of the system (100) illustrated in FIG. 1.1 may also execute all or part of the method shown in FIG. 2.2 without departing from the scope of the invention.

In Step 220, appropriate telemetry collection is initiated. In one or more embodiments, the AEGDL manager may initiate the appropriate telemetry collection. As discussed above, monitoring services or other telemetry collectors executing on testing devices or other devices of or operatively connected to the TCC may obtain/generate telemetry information associated with the performance of the DUTs of the TCC during the execution of the test case. In one or more embodiments, the test case parameters may specify the appropriate telemetry collection to be performed. For example, the test case parameters may specify particular performance metrics associated with each DUT to collect, all logs and metrics associated with particular DUTs of the TCC, monitoring programs and/or services to execute during the performance of the test case, telemetry collection duration, sampling rates, etc. In one or more embodiments, the AEGDL manager may send a request to the TCC (or one or more components therein) to perform the telemetry collection specified by the test case parameters. The request may specify the required telemetry collection, the duration of telemetry. In response to obtaining the request, one or more testing devices and/or DUTs TCC may set up (e.g., load and begin execution of monitoring programs, binaries, images, etc.) and begin performing the telemetry collection. The appropriate telemetry collection may be initiated via other and/or additional methods without departing from embodiments disclosed herein.

In Step 222, test configuration cluster state is confirmed. In one or more embodiments, the AEGDL manager may then confirm the test configuration cluster state. The AEGDL manager may compare the test configuration information specifying the state of the TCC with the test case parameters to ensure that the TCC is in the required state to perform the test case. In one or more embodiments, the AEGDL manager may request and obtain updated test configuration information from the TCC to confirm that the appropriate software/ firmware is, or will be, executing, the correct versions of the software/firmware, the appropriate monitoring and telemetry collection services are initiated, etc. If there is a discrepancy between the updated test configuration cluster information and the test case parameters, then the AEGDL manager may request the TCC to update the TCC to match the configuration required by the test case parameters. The test configuration cluster state may be confirmed via other and/or additional methods without departing from embodiments disclosed herein.

In Step 224, the test case is performed. In one or more embodiments, the AEGDL manager may send a request to the TCC to perform the test case. In response to obtaining the request, the DUTs may begin executing the one or more workloads, programs, and/or services associated with the test case. Additionally, the testing devices and/or the DUTs may begin telemetry collection and monitoring services. Furthermore, upon execution of the one or more workloads, programs, and/or services, or any configurable time afterwards (as specified by the test case parameters), the testing devices may also induce the error scenario. The testing devices and/or the DUTs may continue telemetry collection and monitoring services for a configurable period of time after the error scenario is induced or until a failure or success event occurs as specified by the test case parameters associated with the test case. The test case may be performed via other and/or additional methods without departing from embodiments disclosed herein.

In Step 226, testing information associated with the test case is generated based on telemetry collection. In one or more embodiments, the TCC (e.g., one or more testing devices and/or DUTs) may provide the telemetry information generating during telemetry collection and execution of monitoring services to the AEGDL manager. The telemetry information may include the performance metrics, logs, and/or any other information associated with one or more DUTs during the performance of the test case without departing from embodiments disclosed herein. The telemetry information may be provided to the AEGDL manager at the completion of the test case or periodically according to a user defined frequency during the performance of the test case. Upon receipt of the telemetry information, the AEGDL manager may associate the obtained telemetry information with the test case (e.g., the test case identifier corresponding to the test case) to generate testing information, that is label the telemetry information with the test case). The AEGDL manager may update the testing information include additional telemetry information if more test runs of the test case are performed or as more telemetry information is obtained from the TCC. As a result, the testing information may include a labeled dataset associated with the test case such that a prediction model may be trained using the testing information to identify error scenarios in clusters with the same and/or similar configurations as the TCC that performed the test case used to generate the testing information.

In Step 228, the test configuration cluster is reset. In one or more embodiments, the AEGDL manager may send a request to the TCC to reset the test configuration cluster to the state prior to the performance of the test case. In response to obtaining the request, the TCC may revert to the TCC state prior to execution of the test case. Resetting the TCC may include, for example, deleting data generated during the execution of the test case, reversing the error scenario, undoing changes made to the DUTs as a result of executing the test case, etc. Resetting the test case may include action to undo the changes to the TCC during performance of the test case without departing from embodiments disclosed herein. The test configuration cluster may be reset via other and/or additional methods without departing from embodiments disclosed herein.

In Step 230, a determination is made as to whether there are additional test runs. In one or more embodiments, the AEGDL manager may determine whether there are additional test runs using the test case parameters. The AEGDL manager may track the number of times a test case is performed. Additionally, the test case parameters may specify the number of runs or iterations that a test case is to be performed. In one or more embodiments disclosed herein, if the number of times the test case has already been performed is less than the number of iterations of the test case specified in the test case parameters, then the AEGDL manager may determine that there are additional test runs to perform. In one or more embodiments disclosed herein, if the number of times the test case has already been performed is not less than the number of iterations of the test case specified in the test case parameters, then the AEGDL manager may determine that there are no additional test runs to perform.

In one or more embodiments disclosed herein, if it is determined that there are additional test runs, then the method proceeds to Step 220. In one or more embodiments disclosed herein, if it is determined that there are no additional test runs, then the method ends following Step 230.

To further clarify embodiments of the invention, a non-limiting example use case is provided in FIGS. 3.1-3.3.

START OF EXAMPLE

The example use case, illustrated in FIGS. 3.1-3.3, is not intended to limit the scope of the embodiments disclosed herein and is independent from any other examples discussed in this application. FIGS. 3.1-3.3 illustrate an example of performing a test case to generate testing information.

Turning now to FIG. 3.1, FIG. 3.1 shows a diagram of the example system at "time 0". For the sake of brevity, not all components involved in the example system may be discussed in FIG. 3.1.

The example system includes an automated event generation and data labeling (AEGDL) manager (320) and a test configuration cluster (TCC) (302). The TCC (302) includes a compute device (306), a network device (308), a storage device (310), testing device A (312A), and testing device B (312B). Testing device A (312A) is a network jammer and testing device B (312B) is an analyzer that monitors the TCC (302) and generates telemetry data and logs associated with the TCC (302). All of the devices in the system are operatively connected to each other via a network (340). Assume that the AEGDL manager (320) is performing test cases.

Turning to FIG. 3.2, at Step 1, the AEGDL manager (320) selects a test case. The test case includes inducing a network error in a TCC with a data protection workload backing up data. After selecting the test case, at Step 2, the AEGDL manager (320) then obtains test case parameters associated with the test case from the test case parameters repository. At Step 3, the AEGDL manager (320) selects the TCC (302) to perform the test case based on the test case parameters and the test configuration cluster information associated with the TCC (302). At Step 4, the AEGDL manager (320) sends a request for current state information to the TCC (302). In response to obtaining the request, at Step 5, the TCC (302) generates current state information and sends the current state information to the AEGDL manager (320). At Step 6, the AEGDL manager (320) determines that the compute device (306), the network device (308), and the storage device (310) need software updates to match the requirements of the test case parameters. Based on the determination, at Step 7, the AEGDL manager (320) requests the TCC (302) to perform the updates then perform the test case. In response to obtaining the request, at Step 8, the compute device (306), the network device (308), and the storage device (310) are updated to the correct software versions.

At Step 9, testing device B (312B) (the analyzer) initializes telemetry collection for the compute device (306), the network device (308) and the storage device (310). At Step 10, the AEGDL manager (320) confirms that the TCC is in the correct state to perform the test case. At Step 11, the compute device (306), the network device (308), and the storage device (310) begin performing the test case and executing the data protection workflow. Sometime after, at Step 12, testing device A (312A) (the network jammer) disconnects the storage device (310) from the network. At Step 13, testing device B (312B) (the analyzer) collects telemetry information associated with the compute device (306), network device (308), and the storage device (310) before, during, and after the storage device (310) is removed from the network. After the telemetry information is collected, at Step 14, the telemetry information is provided to the AEGDL manager (320). At Step 15, the AEGDL manager (320) generates testing information using the telemetry information by associating the telemetry information with the test case to create a labeled dataset capable of training a prediction model.

Moving now to FIG. 3.3, FIG. 3.3 shows a diagram of the same example system after the events of FIG. 3.2. For the sake of brevity, not all components involved in the example internal network traffic may be discussed in FIG. 3.2.

At Step 16, the AEGDL manager (320) determines that another iteration of the test case is to be performed and sends a request to the TCC (302) to reset the devices for a second iteration of the test case. In response to obtaining the request, at Step 17, the compute device (306), network device (308), and the storage device (310) are reset to the required state based on the test case parameters. After that, at Step 18, testing device B (312B) (the analyzer) initializes telemetry collection for the compute device (306), the network device (308) and the storage device (310). At Step 19, the AEGDL manager (320) confirms that the TCC is in the correct state to perform the test case. At Step 20, the compute device (306), the network device (308), and the storage device (310) begin performing the test case and executing the data protection workflow.

Sometime after, at Step 21, testing device A (312A) (the network jammer) disconnects the storage device (310) from the network. At Step 22, testing device B (312B) (the analyzer) collects telemetry information associated with the compute device (306), network device (308), and the storage device (310) before, during, and after the storage device (310) is removed from the network. After the telemetry information is collected, at Step 23, the telemetry information is provided to the AEGDL manager (320). At Step 24, the AEGDL manager (320) updates testing information using the telemetry information generated in the second iteration of the test case by associating the new telemetry information with the test case. At Step 25, the AEGDL manager (320) provides the testing information to a machine learning model training device (not shown), and the machine learning model training device trains a prediction model to predict network failures in data protection workloads in configurations similar or the same as in the TCC (302) using the generated testing information.

END OF EXAMPLE

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating testing information, comprising:

identifying, by an automated event generation and data labeling (AEGDL) manager, a test case initiation event;

in response to the identification:

selecting a first test case of a plurality of test cases;

identifying a first test configuration cluster (TCC) of a plurality of TCCs based on the test case;

performing the first test case in the TCC;

generating testing information based on the performing of the first test case in the TCC; and providing the testing information to prediction models for model training; and initiating telemetry collection associated with the first test case to generate telemetry information;

confirming test configuration cluster configuration is in a required state based on the test case;

performing a first iteration of iterations of the first test case; and resetting the first test configuration cluster.

2. The method of claim 1, wherein:

the first TCC comprises a first configuration of compute devices, network devices, and storage devices; and a second TCC of the plurality of TCCs comprises a second configuration of compute devices, network devices, and storage devices.

3. The method of claim 2, wherein the first TCC further comprises at least one testing device that performs at least a portion of the first test case.

4. The method of claim 1, wherein:

the first test case comprises a first error scenario associated with the first TCC; and a second test case of the plurality of test cases comprises a second error scenario associated with the first TCC.

5. The method of claim 4, wherein the testing information comprises:

telemetry information associated with the first TCC generated during the performance of the first test case; and a label specifying the first error scenario.

6. The method of claim 5, wherein generating the testing information based on the performing of the first test case in the TCC comprises labeling the telemetry information with the label to enable prediction model training.

7. The method of claim 1, wherein performing the first test case in the TCC comprises: making a first determination that additional test iterations are required; and in response to the first determination:

performing a second iteration of iterations of the first test case.

8. The method of claim 1, wherein identifying the first TCC comprises comparing TCC configuration information associated with the first TCC with test case parameters associated with the first test case.

9. The method of claim 8, wherein the test case parameters further specify:

the iterations;

the configuration information; and the required state.

10. The method of claim 1, wherein the AEGDL manager executes in an on-premises environment comprising the plurality of TCCs.

11. The method of claim 1, wherein the AEGDL manager executes in a cloud environment operatively connected to the plurality of TCCs.

12. A system for generating testing information, comprising:

a processor;

memory storing computer executable instructions when executed by the processor to:

identifying, by an automated event generation and data labeling (AEGDL) manager, a test case initiation event;

in response to the identification:

selecting a first test case of a plurality of test cases;

identifying a first test configuration cluster (TCC) of a plurality of TCCs based on the test case;

performing the first test case in the TCC, wherein performing the first test case in the TCC comprises:

initiating telemetry collection associated with the first test case to generate telemetry information;

confirming test configuration cluster configuration is in a required state based on the test case;

performing a first iteration of iterations of the first test case; and resetting the first test configuration cluster;

generating testing information based on the performing of the first test case in the TCC; and providing the testing information to prediction models for model training.

13. The system of claim 12, wherein: the first TCC comprises a first configuration of devices; and a second TCC of the plurality of TCCs comprises a second configuration of devices.

14. The system of claim 13, wherein the first configuration of devices comprises compute devices, network devices, and storage devices.

15. The system of claim 13, wherein the first TCC further comprises at least one testing device that performs at least a portion of the first test case.

16. The system of claim 12, wherein: the first test case comprises a first error scenario associated with the first TCC; and a second test case of the plurality of test cases comprises a second error scenario associated with the first TCC.

17. The system of claim 16, wherein the testing information comprises:

telemetry information associated with the first TCC generated during the performance of the first test case; and a label specifying the first error scenario.

18. The system of claim 17, wherein generating the testing information based on the performing of the first test case in the TCC comprises labeling the telemetry information with the label to enable prediction model training.

19. The system of claim 12, wherein performing the first test case in the TCC comprises: making a first determination that additional test iterations are required; and in response to the first determination: performing a second iteration of iterations of the first test case.

\*   \*   \*   \*   \*